(12) United States Patent
Assour et al.

(10) Patent No.: US 6,434,648 B1
(45) Date of Patent: Aug. 13, 2002

(54) PCMCIA COMPATIBLE MEMORY CARD WITH SERIAL COMMUNICATION INTERFACE

(75) Inventors: Jacques Assour, Melville, NY (US); David E. Merry, Jr., Ware, MA (US); Grady David Lambert, Clearwater, FL (US)

(73) Assignee: Smart Modular Technologies, Inc., Wilmington, MA (US)

( * ) Notice: Subject to any disclaimer, the term of this patent is extended or adjusted under 35 U.S.C. 154(b) by 0 days.

(21) Appl. No.: 09/208,890

(22) Filed: Dec. 10, 1998

(51) Int. Cl.$^7$ ............................ G06F 13/00; G06F 13/12
(52) U.S. Cl. ................... 710/102; 710/129; 710/62; 710/63; 710/72
(58) Field of Search ............... 710/102, 62, 63–64, 710/71, 72, 129

(56) References Cited

U.S. PATENT DOCUMENTS

| | | | | |
|---|---|---|---|---|
| 5,179,661 A | * | 1/1993 | Copeland, III et al. | 710/72 |
| 5,343,319 A | * | 8/1994 | Moore | 710/129 |
| 5,420,412 A | | 5/1995 | Kowalski | |
| 5,497,464 A | * | 3/1996 | Yeh | 710/128 |
| 5,517,407 A | | 5/1996 | Weiner | |
| 5,562,504 A | | 10/1996 | Moshayedi | |
| 5,606,732 A | | 2/1997 | Vignone, Sr. | |
| 5,619,396 A | | 4/1997 | Gee et al. | |
| 5,655,143 A | | 8/1997 | Alpert et al. | |
| 5,660,568 A | | 8/1997 | Moshayedi | |
| 5,793,989 A | * | 8/1998 | Moss et al. | 710/105 |
| 5,802,325 A | * | 9/1998 | Le Roux | 710/102 |
| 5,808,571 A | * | 9/1998 | Kuwata et al. | 341/100 |
| 6,125,405 A | * | 9/2000 | Farges | 710/2 |
| 6,182,162 B1 | | 1/2001 | Estakhri et al. | |

* cited by examiner

*Primary Examiner*—Robert Beausoleil
*Assistant Examiner*—Raymond N Phan
(74) *Attorney, Agent, or Firm*—Lyon & Lyon, LLP

(57) ABSTRACT

A PCMCIA compatible memory card having a serial communication interface is provided. The serial communication interface includes a controller, a serial transceiver, and a serial communication port. Coupled between the controller and the serial communication port, the transceiver enables the controller to send or receive data through the serial communication port. Nonvolatile memory on the card is accessible by the controller. A cable connects the serial communication port of the memory card to a serial communication port of an external host computer. The controller operates in accordance with commands received from the host computer through the serial communication port of the card for sending data read from memory of the card to the computer, writing data to memory of the card received from the computer, loading a file into memory of the card received from the computer, erasing data from memory of the card, or verifying data in memory on the card. The memory card may be part of a system including the computer and the cable connecting the computer to the serial communication port of the card. The nonvolative memory of the memory card can also be accessed by a digital system having a PCMCIA interface slot via a PCMCIA parallel interface on the memory card. In one embodiment, the computer is connected through the memory card to an external memory card by connecting the PCMCIA parallel interface of the memory card to the parallel interface of the external memory card. This couples the controller of the card to the memory of the external memory card and enables commands received by the controller from the computer to affect the memory of the external memory card.

44 Claims, 8 Drawing Sheets

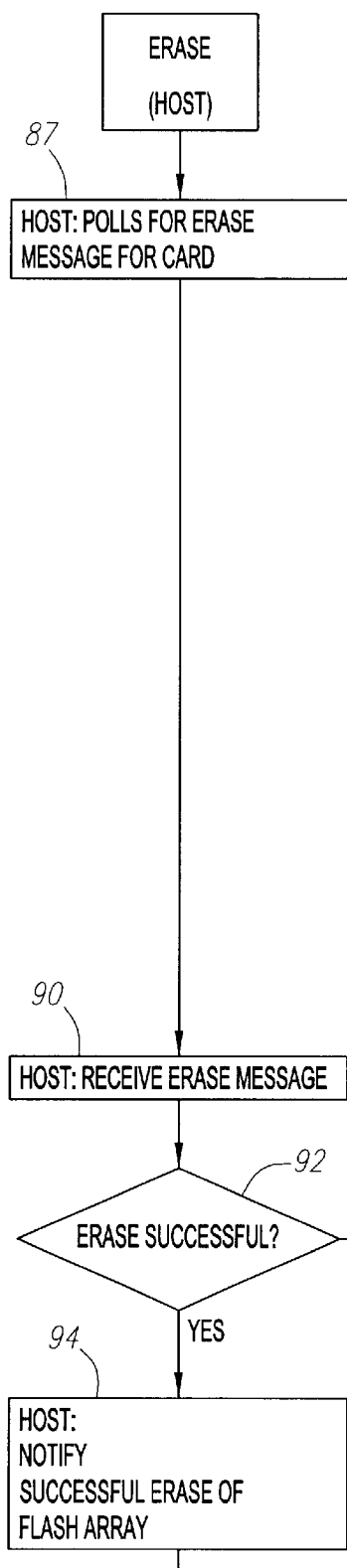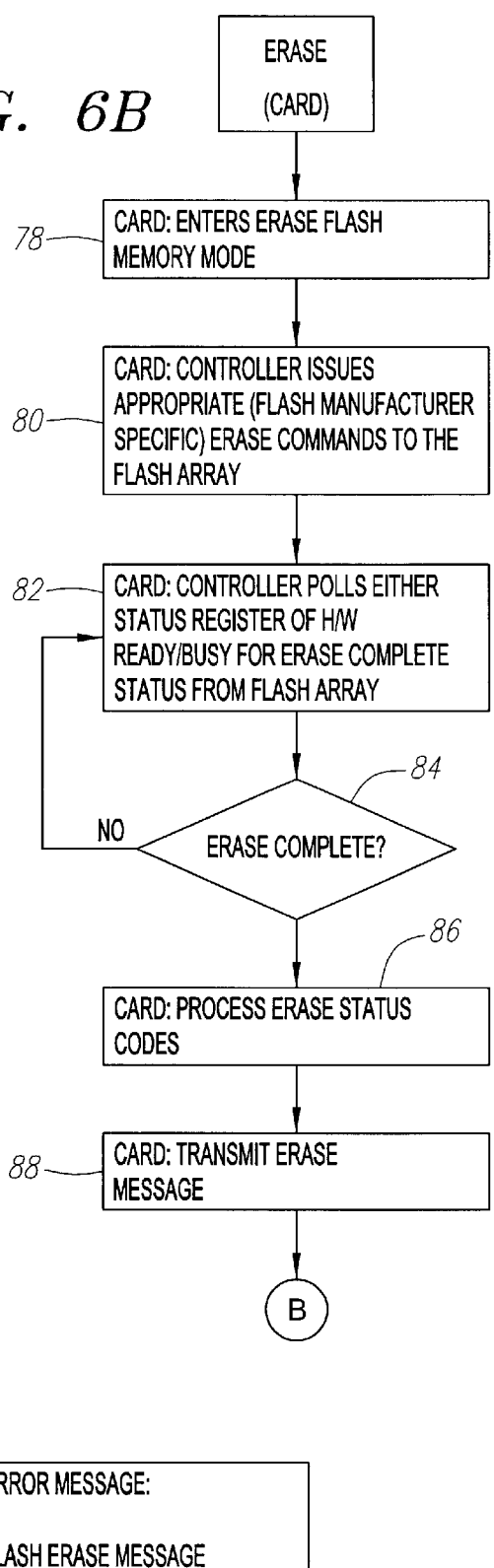
FIG. 6B
FIG. 6A

PCMCIA COMPATIBLE MEMORY CARD WITH SERIAL COMMUNICATION INTERFACE

FIELD OF INVENTION

The present invention relates to a memory card, and relates particularly to, a memory card which is PCMCIA compatible and has a serial communication interface for serial communication between the card and an external computer or other computer-based system. This invention is suitable for providing a memory card which can connect to a personal computer having a serial communication port, but no PCMCIA compatible interface. The invention further relates to a system and method for enabling serial communication between a PCMCIA compatible memory card and a computer.

BACKGROUND OF THE INVENTION

Typically, memory cards compatible with PCMCIA (Personal Computer Memory Card International Association) standard are used to install memory in a small form factor for digital computer systems, such as laptops, palm-top, or other computer-based equipment. The memory cards contain a printed circuit board with a 68-pin interface at one end which is insertable through a slot into a PCMCIA compatible interface of a digital computer system. When inserted, memory on the circuit board, typically in the form of FLASH or SRAM memory components, is accessible to the digital computer system. Memory cards under the PCMCIA standard may be Type I, II, or III, and are often called memory PC cards.

Memory on a memory card is conventionally configured at manufacture by a host computer having a PCMCIA compatible slot into which the memory card is inserted. After manufacture it is desirable for users to have the memory of their memory cards updated or otherwise modified to increase their flexibility, such as when a memory card contains information which must be updated to remain current, or contains an outdated version of an application program. Generally, users have had to purchase a new memory card or send the memory card to the manufacturer to obtain the desired updated information or application program. Purchasing a new card, or sending the memory card to the manufacturer each time a memory card update is needed, is both expensive and time consuming.

Although access for updating the memory of a memory card could be enabled through the personal computers usually owned by users, such computers typically lack a PCMCIA compatible interface having a slot to receive a memory card. One solution is for a user to obtain an I/O device having a PCMCIA compatible slot and then coupling the I/O device to a personal computer for communication to a memory card when inserted in the I/O device. This is undesirable since it requires each user to incur the expense of purchase of the I/O device, and connecting the I/O device to a computer can be difficult for the unskilled user.

SUMMARY OF THE INVENTION

Accordingly, it is the principal object of the present invention to provide an improved memory card having a serial communication interface which can be easily coupled to an external host computer lacking a PCMCIA compatible interface, thereby enabling the memory of the card to be modifiable by the computer.

It is another object of the present invention to provide an improved system and method for enabling serial communication between a memory card and an external host computer.

It is a further object of the present invention to provide an improved system and method for enabling serial communication between a memory card and an external host computer wherein the memory card has a controller which operates in accordance with commands received from the computer through a serial communication port of the card.

A still further object of the present invention is to provide an improved memory card having a serial communication interface which can function as a typical memory card to enable access to its memory, through a PCMCIA parallel interface on the card, when the card at the parallel interface is inserted into a PCMCIA compatible slot of a digital system.

It is yet another object of the present invention to provide an improved system and method for enabling communication between an external memory card, lacking a serial communication interface port, and an external host computer, lacking a PCMCIA compatible interface, through a memory card having a serial interface to the computer.

Briefly described, the PCMCIA compatible memory card embodying the present invention includes a serial communication interface having a serial I/O (input/output) port, a controller, and a serial I/O transceiver which couples the controller and the serial I/O port to enable the controller to send or receive signals representing data through the serial communication port. Non-volatile memory on the card in one or more memory components is coupled to the controller. A cable connects the serial communication port of the memory card to a serial communication port of an external host computer. The controller operates in accordance with commands received from the host computer through the serial communication port for sending data read from memory of the card to the host computer, writing data to memory of the card received from the host computer, loading a program file (or other data file) into memory of the card received from the host computer, erasing data from the memory of the card, or verifying data in memory on the card. Other commands may be received from the host computer, such as for performing a self-test.

The serial communication port is located at one end of the card, and a PCMCIA parallel interface is located at the other end of the card. The memory card can also connect through a slot of a PCMCIA interface of a digital system, as is typical of PCMCIA compatible memory cards, to enable the digital system to access the memory of the card.

In one embodiment, the computer may communicate through the memory card to an external memory card, which is PCMCIA, CFA (Compact Flash Association), or MCIF (Miniature Card Implementation Forum) compatible, by using a coupler to connect the parallel interface of each card to each other, thereby coupling the controller to the memory of the external memory card and enabling commands received by the controller from the host computer to affect (read/write/erase/program) the memory of the external memory card.

A system also embodies the present invention which includes the memory card, the host computer, and the cable connecting the serial communication port of the host computer to the serial communication port of the card through which information is serially transmitted between the card and the host computer.

The present invention further includes a method for serial data communication between a PCMCIA compatible memory card and an external host computer, which includes: providing a serial communication port on the memory card; connecting the serial communication port of the memory card to a serial communication port of the computer; and communicating information serially between the memory card and the host computer through the connected serial communication port of the memory card and the serial communication port of the host computer.

BRIEF DESCRIPTION OF THE DRAWINGS

The foregoing objects, features and advantages of the invention will become more apparent from a reading of the following description in connection with the accompanying drawings, in which:

FIGS. 6A and 6B are flow charts showing the operation and programming of the host computer and memory card, respectively, in accordance with an Erase command;

DETAILED DESCRIPTION OF THE INVENTION

Figure 1:
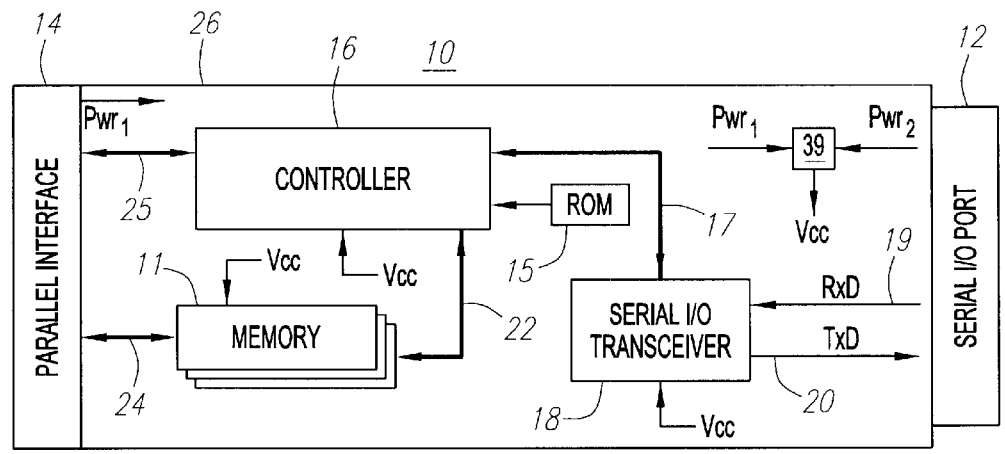
FIG. 1 is a block diagram of the memory card in accordance with the present invention.

Referring to FIG. 1, a block diagram of the memory card 10 of the present invention is shown. Memory card 10 represents a PCMCIA compatible memory card and operates as a typical memory card for enabling access to memory 11 via a parallel interface 14 on the card. Memory 11 represents an array of nonvolatile memory components (i.e., chips), such as FLASH or EEPROM memory, or SRAM memory having typical backup battery circuitry. When memory 11 represents FLASH memory, memory 11 may include a typical ATA controller to provide a file system for accessing memory. FLASH memory can be NAND or NOR type FLASH. Memory card 10 includes serial I/O communication port 12 on one end of the card. The serial I/O port 12 is a socket for receiving multiple pins of a connector which provide signals in accordance with the desired communication protocol, such as RS-232, RS-422, RS-485, USB, IrDA, 1394, SPI, or other serial-based communication protocols. The parallel interface 14 is located at the other end of the card opposite serial I/O port 12. Parallel interface 14 is a typical 68-pin PCMCIA socket which is insertable into a slot of a PCMCIA compatible interface of a digital system (not shown). The digital system may be a palmtop, laptop, a desktop computer, or other microprocessor-based equipment.

The memory card 10 further includes a controller 16 which is coupled to the serial I/O port 12 via a serial I/O transceiver 18. Controller 16 controls the communication (transmission and reception) of serial information from the serial I/O port 12, and may, for example, be a processor, such as an 8, 16, or 32-bit microprocessor or a microcomputer. The serial I/O transceiver 18 decodes serial data signals on receive data line 19 (RxD) from the serial I/O port 12 and provides the decoded serial data signals to controller 16 via data line 17. The serial I/O transceiver 18 also encodes serial data signals received from the controller 16, via line 17, for transmission as serial data along transmit data line 20 (TxD) through serial I/O port 12. Data line 17 represents a bidirectional communication line between the controller 16 and the serial I/O transceiver 18, but may alternatively represent separate transmitting and receiving lines. Additional control signal lines may be used for hardware handshaking to facilitate flow control between controller 16 and transceiver 18.

The encoding and decoding of signals by serial I/O transceiver 18 represent the conversion of signals received or transmitted via the serial I/O port 12 into compatible signals for the controller 16. For example, where the memory card 10 provides for an RS-232 connection, the serial I/O transceiver 18 converts bits received from the controller in CMOS or TTL logic (e.g., 0 or 5 volts) into bipolar voltage signals of approximately +8 to +10 volts or –8 to –10 volts. Serial I/O transceiver 18 may, for example, be an RS-232 Transceiver chip manufactured by Maxim, Inc. of Sunnyvale, Calif., or Dallas Semiconductor, Inc. of Dallas, Tex., or another type of transceiver chip in accordance with other serial communication protocols, such as RS-422, RS-485, USB, 1394, SPI, or IrDA. Thus, the present invention is not limited to the use of any particular serial communication protocol.

Serial data representing information to be transmitted on data line 17 is formatted (or coded) by the controller 16 in a data packet composed of a start character, serial data, and an end character. For example, the start character may be a "$" and the end character a "#". The packet may also be temporarily stored in a data buffer in RAM of the controller, such that each bit of the packet can be serially transmitted to the serial I/O transceiver 18 via data line 17. Serial data representing information received by controller 16 from data line 17 has the same data structure, such that the controller 16 can identify (or decode) the serial data in the packet. The controller 16 may temporarily store a received packet in a data buffer in RAM of the controller. A ROM 15 is accessible to the controller and stores a program for operating the controller for coding and decoding serial data. ROM 15 may be external to controller 16, as shown in FIG. 1, or internal to the controller 16. The controller 16 is also coupled to memory 11 by lines 22, such as address lines, data lines, and control lines (e.g., status register line and H/W Ready/Busy line), to access (read, write, or erase) data at locations associated with memory addresses. The ROM 15 further stores the codes (or commands) and communication protocols specified by the manufacture of the chips of memory 11 for enabling the controller to access (read/write/erase) data of the memory. The serial transceiver 18, serial I/O port 12 and controller 16 thus provide a serial communication interface for the memory card 10.

Lines 24 between parallel interface 14 and memory 11 represent address lines, data lines, and control lines, from parallel interface 14 to enable an external digital system (not shown), when connected to parallel interface 14, to access memory 11. Optionally, instead of line 24 being connected directly to memory 11, an I/O buffer can be coupled between lines 24 and line 22 such that memory 11 can be coupled to either parallel interface 14 or controller 16.

All the elements of the card 10 are assembled on a circuit board 26 which is contained in a housing (denoted as 32 in FIG. 2) having the shape and size typical of a PCMCIA compatible card. The housing may have dimensions in accordance with Type I, II, or III PCMCIA formats.

Figure 2:
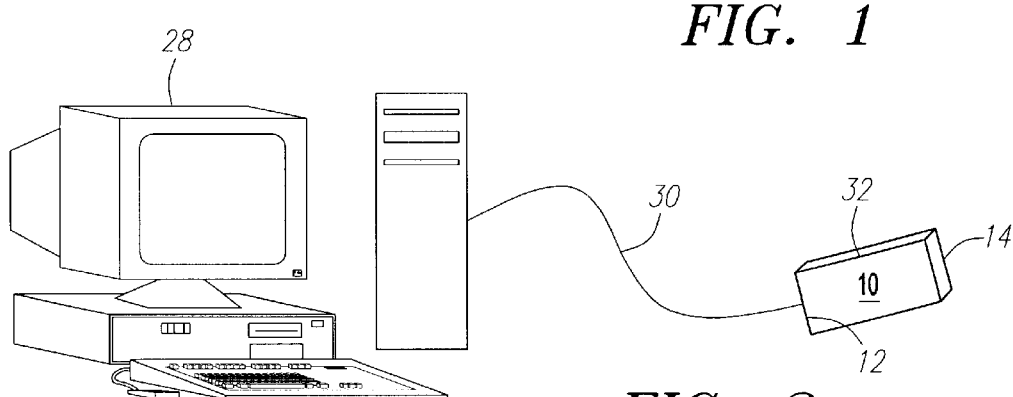
FIG. 2 is a block diagram of the system according to the present invention with the memory card of FIG. 1.

Referring to FIG. 2, memory card 10 is shown connected by a cable 30 to an external host computer 28, such as a personal computer or computer workstation. Cable 30 couples a serial I/O port of the host computer 28 to the serial I/O port 12 of the memory card 10, where the host computer has a compatible serial communication protocol to that used by the memory card. The host computer is programmed to send and receive data packets, such as described earlier, through its serial I/O port to and from the memory card 10, such as provided by typical data communication software, such as HyperTerminal developed by Hilgraeve, Inc., of Monroe, Mich. for Windows 95 sold by Microsoft, Inc., or other communication software customized for serial data transmission and reception in accordance with the communication protocol and the data packet format used by memory card 10. Thus, the memory card 10 and the host computer 28 can communicate with each other, even though the host computer may not have typical PCMCIA compatible interface which can be coupled to the parallel interface of a memory card. When the card is coupled by cable 30 to host computer 28, power (Vcc) is supplied to components on the memory card 10 either by the card being located at its parallel interface 14 in a PCMCIA compatible slot for purposes of receiving power via the parallel interface, or by the card receiving power through the serial I/O port 12 from cable 30, as described below.

Figure 3:
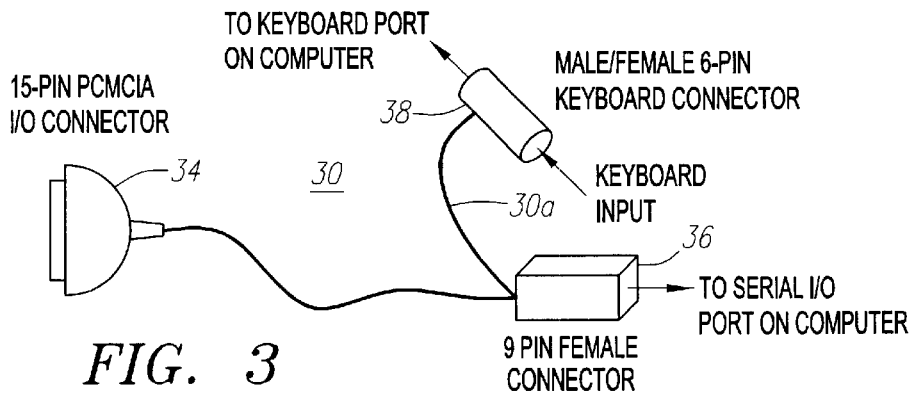
FIG. 3 is a block diagram of the cabling in the system of FIG. 2 for coupling the memory card to an external host computer.

Referring to FIG. 3, an example of cable 30 is shown. For purposes of illustration, the cable 30 is described for the RS-232C communication protocol, however other serial communication protocols may also be used. At one end, cable 30 has a connector 34 which can mate with the serial I/O port 12 of the card, and a connector 36 at the other end which can mate with a male RS-232 port of host computer 28. In this example, connector 34 is a 15-pin PCMCIA I/O connector, and connector 36 is a standard 9-pin RS-232 female D-SUB connector. In accordance with RS-232C requirements, the cable length limitation is 50 feet or 2500 pF, or 30 pF per foot of cable with an impedance of 50 ohms.

Figure 3A:
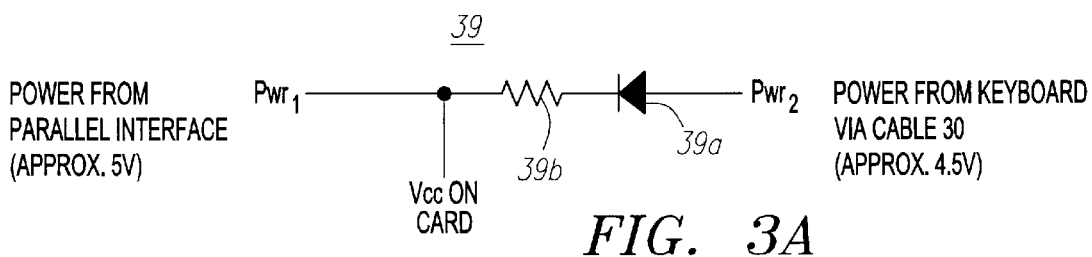
FIG. 3A is an electrical drawing of the voltage sense circuit on the memory card of FIG. 1.

To supply power to the memory card 10 via cable 30, the cable has an extension 30a to an in-line keyboard connector 38 which can be connected to the keyboard port of host computer 28. Connector 38 may be a 6-pin PS/2 Keyboard connector. From the viewpoint of the host computer 28, connector 38 represents an extension (pass through) of the keyboard port of the host computer into which the cable from the host computer's keyboard is inserted. Connector 38 connects to the keyboard power line (5 volts) from the keyboard port of the host computer 28 to supply power along one of the lines within cable 30 to connector 34. If memory card 10 is both connected to a PCMCIA slot of a digital system at parallel interface 14, and connected at serial I/O port 12 to the power at the keyboard port of host computer 28 by cable 30, voltage sense circuit 39 (FIG. 1) detects the presence of dual power sources (i.e., $Pwr_1$ from interface 14 and $Pwr_2$ from port 12) and cuts off the power from the serial I/O port 12. An example of the voltage circuit 39 is shown in FIG. 3A in which the circuit has a diode 39a coupled to a resister 39b in series with the power $Pwr_2$ from the serial I/O port 12. When power $Pwr_1$ is supplied via interface 14, diode 39a is reverse biased since the voltage of $Pwr_2$ (e.g., approximately 4.5 v) is sufficiently less than the voltage of $Pwr_1$ (e.g., approximately 5 v). This cuts off $Pwr_2$ from the serial I/O port 12, thereby enabling the card to source power from the $Pwr_1$.

In the example of FIG. 3, although the connector 36 has nine pins which can be wired through the cable to any of the 15 pins of connector 34, at a minimum, three lines from the cable 30 are used by memory card 10, a receive data line, a transmit data line from the serial I/O port of the host computer 28, and, if needed, power (Vcc) from the keyboard port of the host computer 28. When cable 30 is connected between memory card 10 and host computer 28, the serial I/O port 12 couples the receive data line of the cable to receive data line 19 of the card and the transmit data line of the cable to the transmit data line 20 of the card. Further, in the FIG. 3 example, the remaining seven lines of the RS-232, i.e., data terminal ready, data set ready, request to send, clear to send, ring indicator, and two grounds, to connector 34 may be used, where additional data lines on the card 10 are provided between the serial I/O port, serial I/O transceiver and controller, and the controller is programmed to operate in accordance with signals on such additional lines in communicating with the host computer 28.

The cable 30 may be adapted to other serial communication protocols, such as RS-422, RS-485, USB, IrDA, 1344 or SPI with the appropriate serial I/O transceiver 18, by providing a connector 36 which can be received in the serial I/O port of the host computer in accordance with the other protocol, and connecting via cable 30 the desired transmit data line, receive data line, and, if needed, power line from the serial I/O port of the host computer to the memory card's serial I/O port 12. When the serial I/O port of the host computer 28 is a USB port, power may be sourced directly from the USB port, and extension 30a and connector 38 are not needed. Further, serial communication may be wireless, i.e., without a cable, by providing an infrared (IrDA) or RF I/O transducer to the host computer 28 and a corresponding infrared or RF I/O transducer coupled to the serial I/O port 12 of the memory card, such that transmit data and receive data may be received and transmitted between the card and the host computer. The infrared transducers may be similar to that used typically between remote controllers for televisions. In the case of wireless serial communication, the memory card is inserted into a PCMCIA slot at parallel interface 14 to supply power to the card.

FIGS. 4A–9A and 4B–9B are flow charts showing the operation and programming of the host computer 28 and the controller 16 of the memory card 10, respectively, for serial communication. In particular, FIGS. 4B–9B shows of the programming of the ROM 15, and operation of the controller 16 in accordance with such programming, for responding to a set of commands received from the host computer via the serial I/O port 12. For purposes of illustration, memory 11 is referred to in these figures as FLASH array, and host computer 28 is referred to as the host.

Figures 4A, 4B:
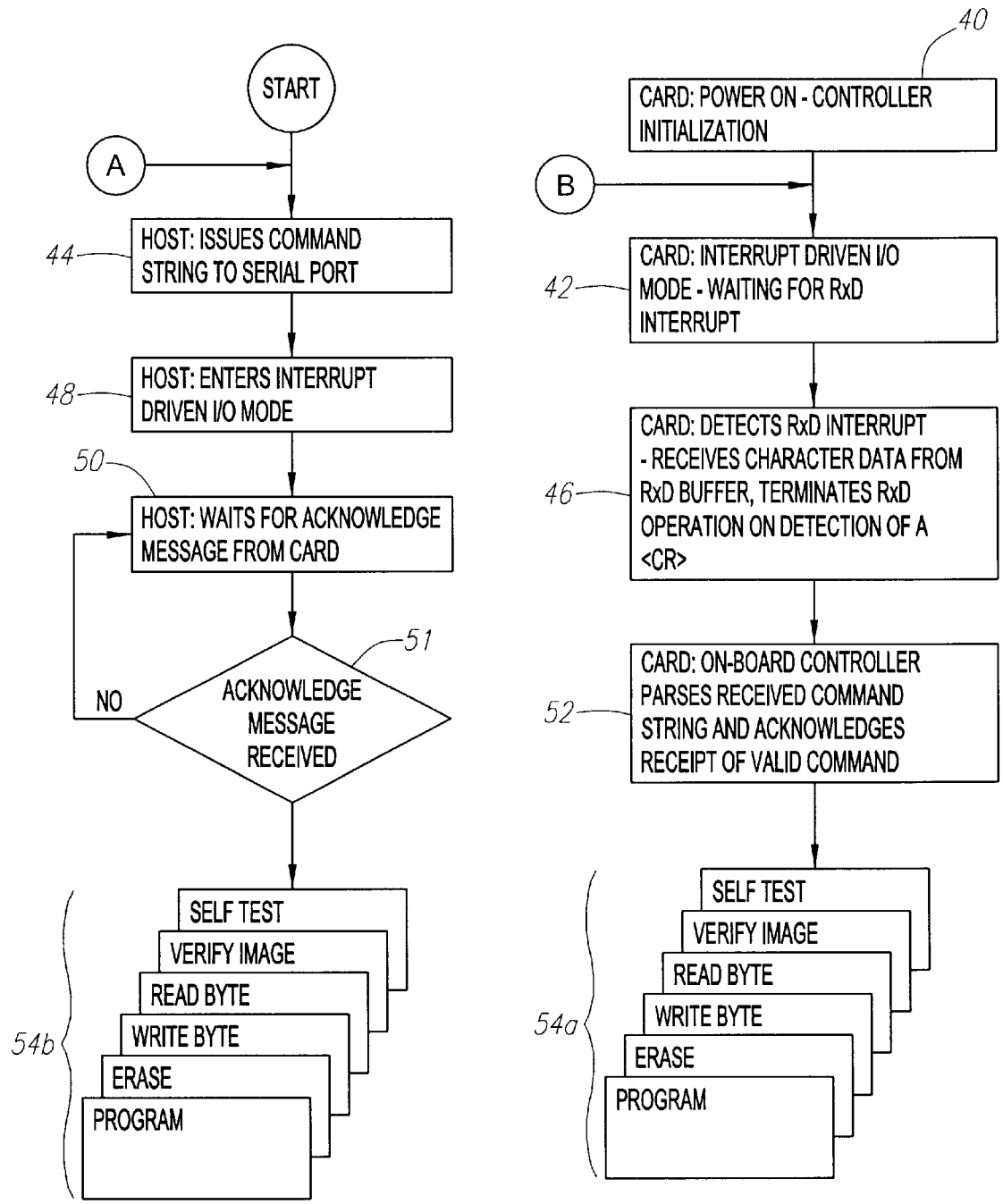
FIGS. 4A and 4B are flow charts showing the operation and programming of the memory card and host computer, respectively, of FIG. 2.

Referring to FIGS. 4A and 4B, when the cable 30 is connected to the serial I/O port 12 of the memory card 10 and the serial I/O port of the host computer, the card receives power from either cable 30, or parallel interface 14, and starts by initializing the controller 16 (step 40). This may be in accordance with the programming of the controller's ROM 15 to set up communication line 17, and buffers in RAM of the controller used to transmit or receive serial data. The controller 16 then enters an interrupt driven I/O mode and waits for an I/O interrupt, which occurs upon the receipt of the first bit of packet from host computer 28 via the serial I/O port 12 (step 42). The host computer 28 next issues a command string as serial data of a data packet to the memory card 10 (step 44). In response, the controller 16 detects the data packet with the command string as an interrupt and stores the serial data received in a receive data (RxD) buffer of the controller until detection of an end delimiter, such as a <CR> or "#" character (step 46). Meanwhile, the host computer 28 has entered an interrupt driven I/O mode (step 48), and waits for an acknowledge message from the card (steps 50 and 51). The controller 16 of the card parses the serial data in the RxD buffer and, if a valid command is detected, sends an acknowledge message to the host computer 28 indicating receipt of a valid command (step 52). A set of commands is stored in memory of the ROM 15 of the host computer 28. The set of commands includes: Self-Test, Verify Image, Read Byte, Write Byte, Erase, and Program. The acknowledge message may be a data packet having serial data identifying receipt of the command, such as a "+". However, if the acknowledge message has a data packet with a "−", then the command was not accepted, and the host computer 28 may resend the command or notify the user that an error has occurred. This represents a handshaking feature between the host computer 28 and card 10, which may be used whenever commands/data are transmitted from the host computer to the card, or vice versa. The controller 16 of the card 10 and the host computer 28 operate responsively to a particular command as shown in the flow charts of FIGS. 5A–9A and 5B–9B, respectively, as indicated by blocks 54a and 54b in FIGS. 4A and 4B.

Figure 5A:
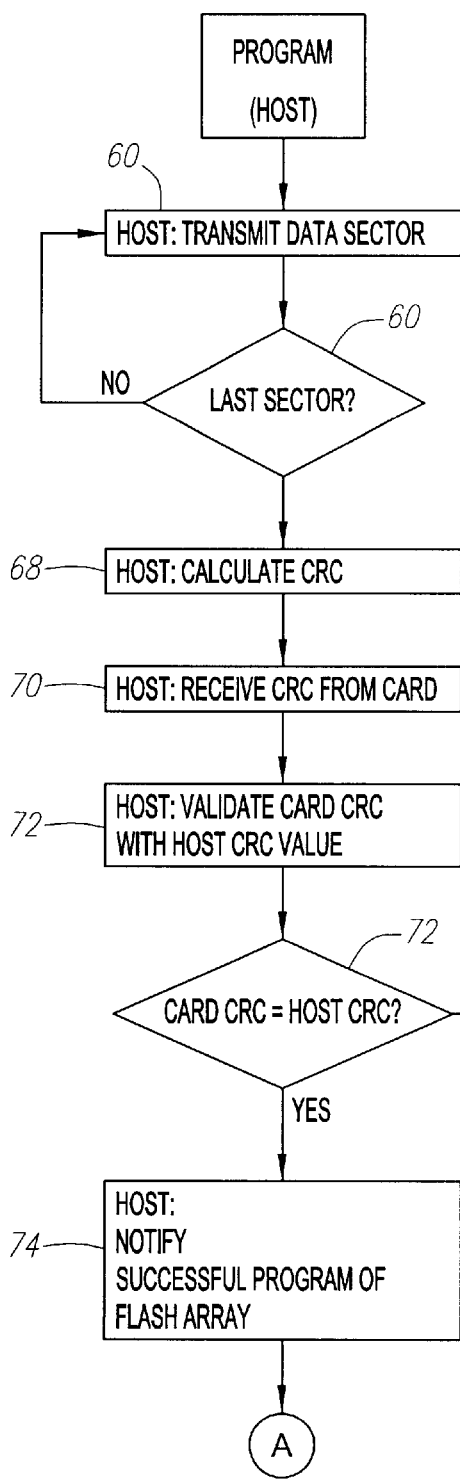
FIGS. 5A and 5B are flow charts showing the operation and programming of the host computer and memory card, respectively, in accordance with a Program command.
Figure 5B:
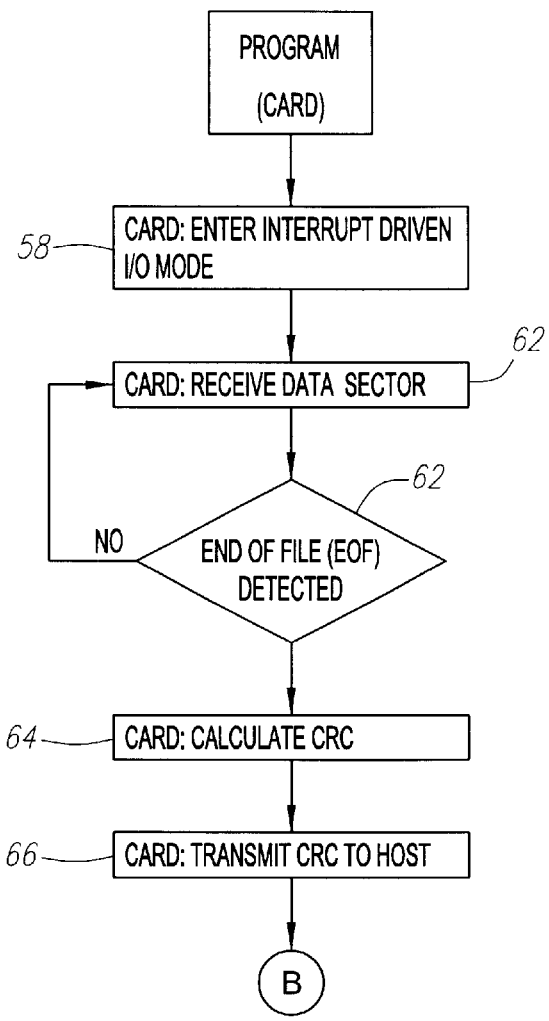

Referring to FIGS. 5A and 5B, when the controller 16 of the memory card 10 receives a Program command, the controller after step 52 (FIG. 4B) enters an interrupt driven I/O mode at step 58. The host computer 28 meanwhile transmits in one or more data packet each of the data sectors of a program file and places an end of file (EOF) identifier at the end of the last sector (step 60). The memory card 10 in turn receives each of the data sectors of the program file until detecting the EOF identifier (step 62) and stores the program file in memory 11 at such memory space allocated for programming. The controller 16 of the card then calculates a CRC value which represents a check sum of the total number of bytes (or bits) received (step 64), and transmits the CRC value in a data packet to the host computer (step 66). The host computer 28 also calculates a CRC value of the total number of bytes (or bits) of the program file transmitted (step 68). The host computer 28 receives the CRC value from the card (step 70) and validates the CRC value received from the card with its calculated CRC value (step 72). If the two CRC values are the same, the host computer 28 notifies its user on the computer's display that the programming of the memory of the card was successful (step 74), otherwise, the user receives an error message that a programming error has occurred (step 76). The host computer 28 then branches back to step 44, and the controller 16 of the card branches back to step 42 for the next command to be issued. Circled letters in the flow charts indicate branching between flow charts. At the host computer 28, the source of the program file may be from a hard disk, floppy disk, RAM, or other memory storage unit of the host computer, or the file may be downloaded from the Internet or other network (LAN, WAN, PSTN) via a network interface (such as a modem and networking software) of the host computer. The term program file used herein may refer to any type of data file whether or not representing a program.

Optionally, when the host computer 28 downloads a program file at step 60 the computer may include preprocessing whereby data to be programmed into the card 10 is compressed prior to being transmitted serially. The controller 16 receives the compressed data at step 62 and expands it back to its original format and programs it into memory 11. The compression may be provided by typical run length encoding methods. For example, if the file contained ten bytes of sequential 0 (zero) Hex this could be coded as a compression character "&" followed by the data value 0 (zero) followed by the number of bytes, 10. Expansion of "&010" would be the reverse process.

Referring to FIGS. 6A and 6B, when the controller 16 of the memory card 10 receives an Erase command, the controller after step 52 (FIG. 4B) enters an erase memory mode (step 78) and the controller 16 issues erase commands to memory 11 which will erase the Flash memory 11 of the memory card (step 80). The erase commands for the Flash memory are specified by the manufacture of the Flash memory chips. The controller 16 polls either the status register or H/W Ready/Busy lines from the Flash memory for erase complete status (step 82) until the erase is complete (step 84). When the erase is complete, the controller 16 processes erase status codes received from the Flash memory (step 86) and then transmits an erase message to the host computer 28 indicating the status of the erase (step 88). The erase message represents a data packet having an identifier indicating that erase was successful, such as "erase complete". Meanwhile, the host computer 28 is polling for an erase message from the memory card (step 87) and upon receiving this message (step 90) checks if the erase was successful (step 92). If so, the host computer 28 notifies the user that the erase was successful (step 94), otherwise the user is notified with a Flash erase error message (step 96). The host computer 28 then branches back to step 44, and the controller 16 of the card branches back to step 42 for the next command to be issued.

Figure 7A:
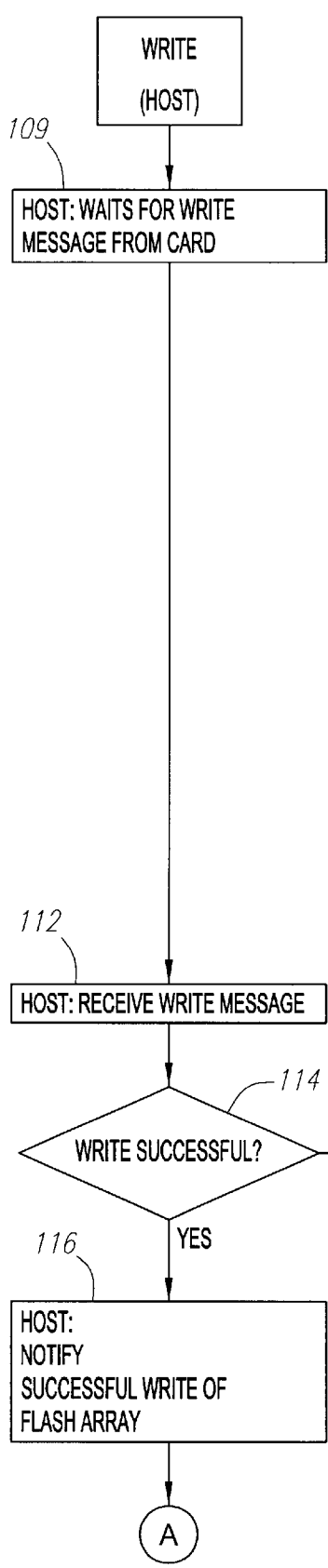
FIGS. 7A and 7B are flow charts showing the operation and programming of the host computer and memory card, respectively, in accordance with a Write command.
Figure 7B:
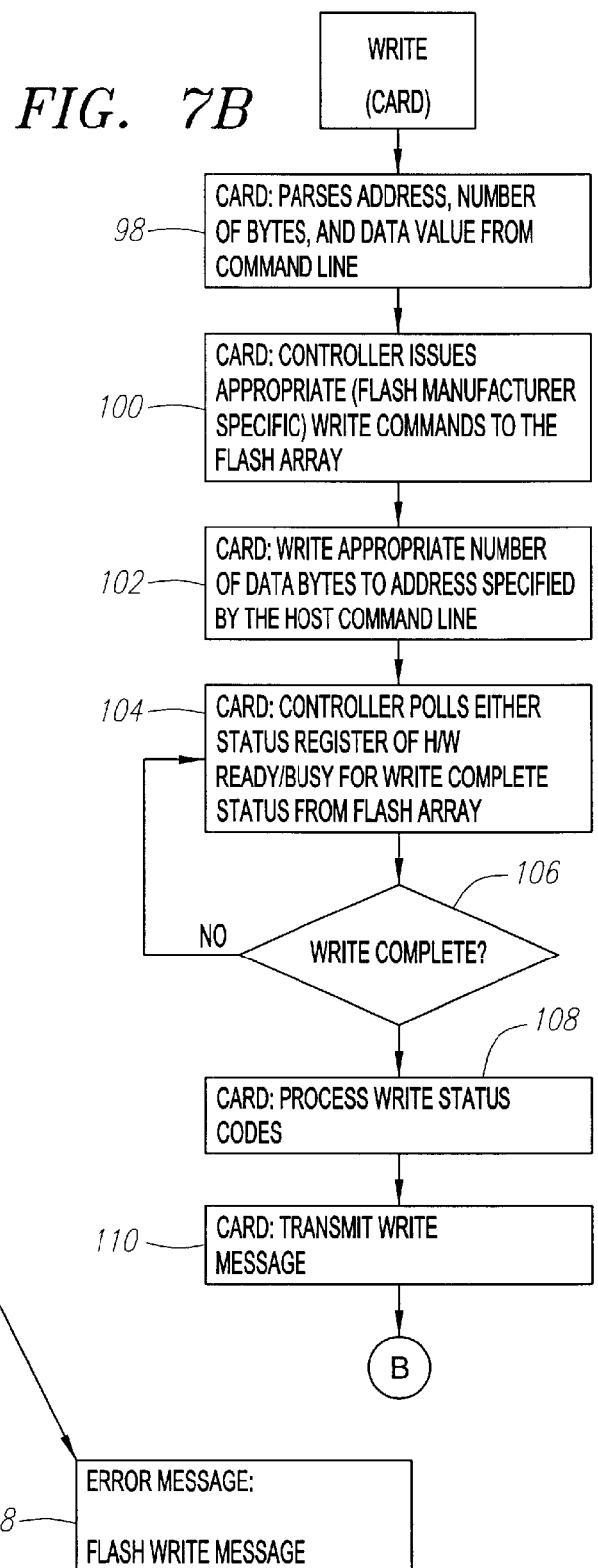

Referring to FIGS. 7A and 7B, when the controller 16 of the memory card 10 receives a Write command, the data packet of the write command includes the address of memory 11 to be written to, the number of bytes to be written, and the data to be written at that address. The controller 16 parses this data packet to identify the address, bytes and data at step 98, and then issues write commands to the Flash memory at step 100. The write commands for the Flash memory are specified by the manufacture of the Flash memory chips. The controller 16 then writes the appropriate number of bytes of data to the address specified with the Write command (step 102). The controller polls either the status register or H/W Ready/Busy lines of the Flash memory for the write complete status (step 104) until the write is complete (step 106). When the write is complete, the controller 16 processes the write status codes received from the Flash memory (step 108), and transmits a write message in accordance with such codes (step 110). Meanwhile, the host computer 28 waits to receive the write message from the memory card (step 109), and upon receiving this message (step 112), checks if the write was successful (step 114). If so, the host computer 28 notifies the user that the write was successful (step 116), otherwise the user is notified with a Flash write error message (step 118). The host computer 28 then branches back to step 44, and the controller 16 of the card branches back to step 42 for the next command to be issued.

Figure 8A:
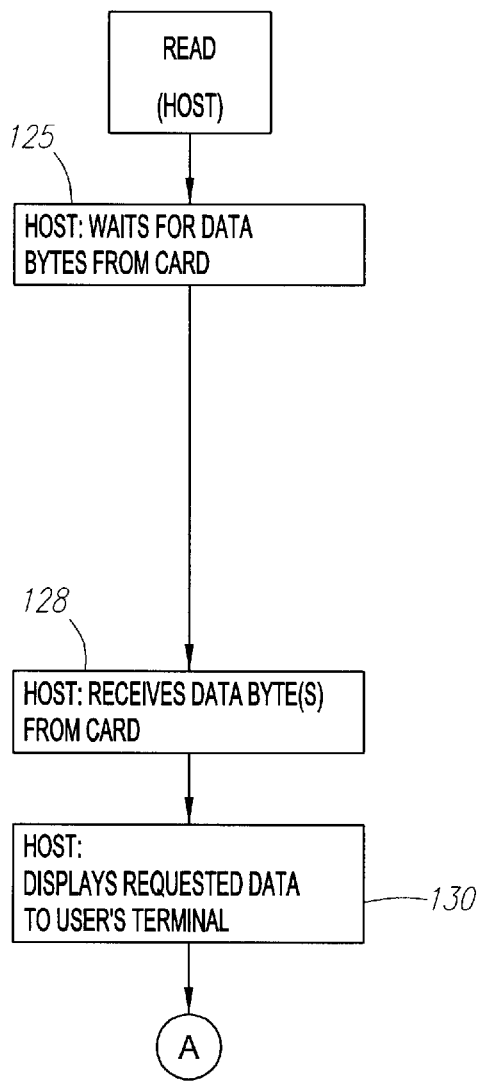
FIGS. 8A and 8B are flow charts showing the operation and programming of the host computer and memory card, respectively, in accordance with a Read command.
Figure 8B:
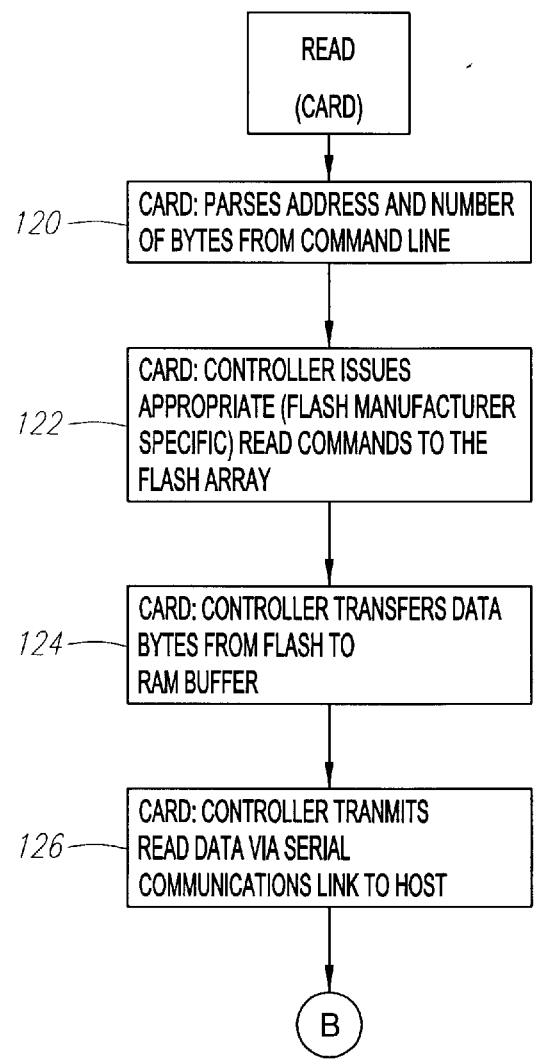

Referring to FIGS. 8A and 8B, when the controller 16 of the memory card 10 receives a Read command, the data packet of the read command includes the address in memory 11 to be read, and the number of bytes to be read at that address. The controller 16 parses this data packet to identify the address and bytes of data at step 120, and then issue read commands to the Flash memory at step 122. These read commands are specific to the Flash memory and are specified by the manufacture of the Flash memory chips. The controller 16 then transfers the bytes of read data from the Flash memory to a buffer established in RAM of the controller (step 124). Next, the controller 16 transmits serially each bit of the data in this buffer to the host computer 28 via the serial I/O port 12 in one or more data packets (step 126). Meanwhile, the host computer 28 waits to receive the bytes of data from the memory card (step 125), and upon receiving this data (step 128) notifies the user that the write was successful (step 130). The host computer 28 then branches back to step 44, and the controller 16 of the card branches back to step 42 for the next command to be issued.

Figures 9A, 9B:
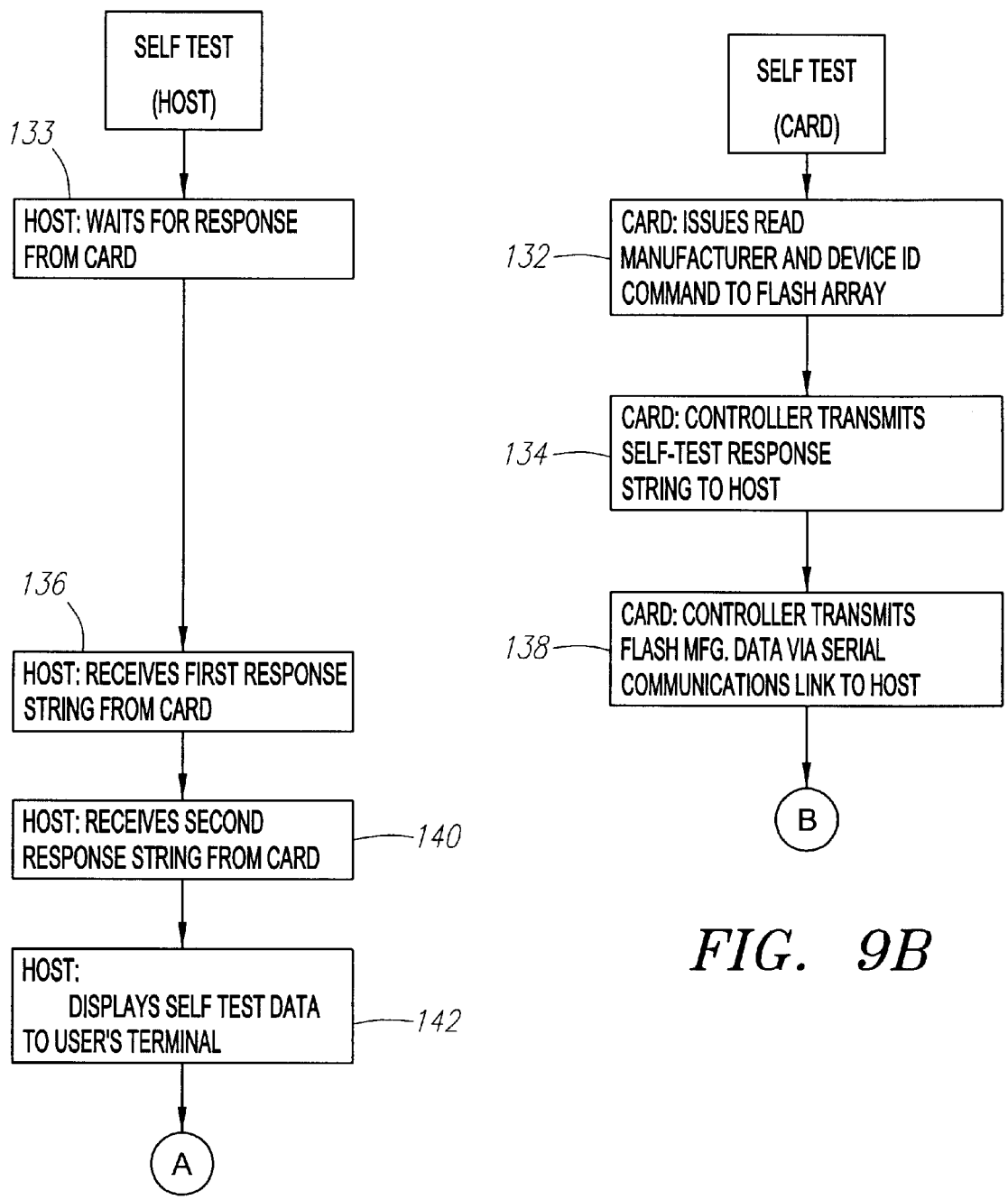
FIGS. 9A and 9B are flow charts showing the operation and programming of the host computer and memory card, respectively, in accordance with a Self-Test command.

Referring to FIGS. 9A and 9B, when the controller 16 of the memory card 10 receives a Self-Test command, the controller reads a manufacture and device ID command from the Flash memory (step 132). The manufacture and device ID is stored in a predefined location of one or more chips of the Flash memory. The controller 16 then sends a predefined self-test response string to the host computer (step 134). The self-test response string is stored in ROM 15 of the card such that controller 16 can read and format the string for transmission in a data packet to the host computer. Meanwhile, the host computer 28 waits for a response from the memory card 10 (step 133), and receives a first response string from the card representing the self-test response string (step 136). The controller 16 then transmits data representing the read Flash manufacture and device ID in a data packet to the host computer 28 (step 138). Next, the host computer 28 receives this data as a second response string, and displays the self test data from the first and second responses to the user via the display (i.e., monitor or terminal) of the host computer (step 142).

When the controller 16 of the memory card 10 receives a Verify Image command, the data packet of the Verify Image command includes the address in memory 11 to be verified, the number of bytes to be verified at that address, and the data to be verified. The operation of the host computer 28 and the controller 16 of the card is similar to that of the Read command described earlier in connection with FIGS. 8A and 8B, except that instead of step 126, the controller 16 compares the read data in the RAM buffer of the controller 16 with the data specified in the Verify Image command, and then transmits a message to the host computer indicating whether verification was successful. If so, the host computer 28 receives the message at step 128 and notifies the user that verification was successful at step 130, otherwise the user is notified with a Verification error message. The host computer 28 then branches back to step 44, and the controller 16 of the card branches back to step 42 for the next command to be issued.

Figure 10A:
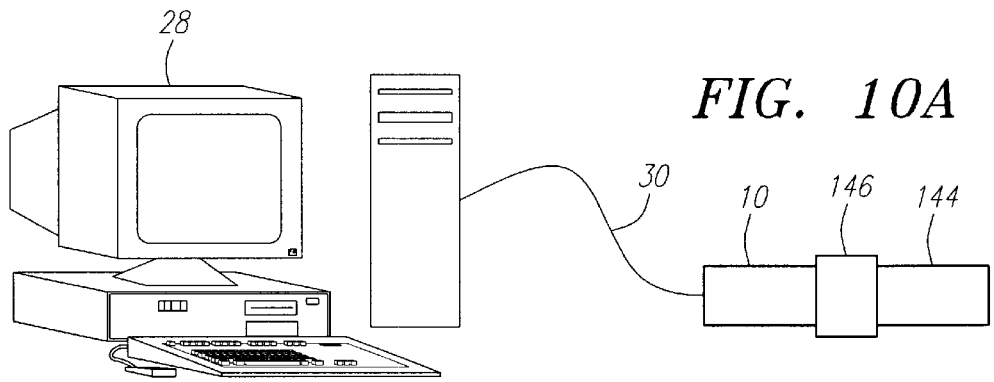
FIG. 10A is a block diagram of one embodiment of the present invention showing a coupler for connecting the memory card of FIGS. 1 and 2 to an external memory card.
Figure 10B:
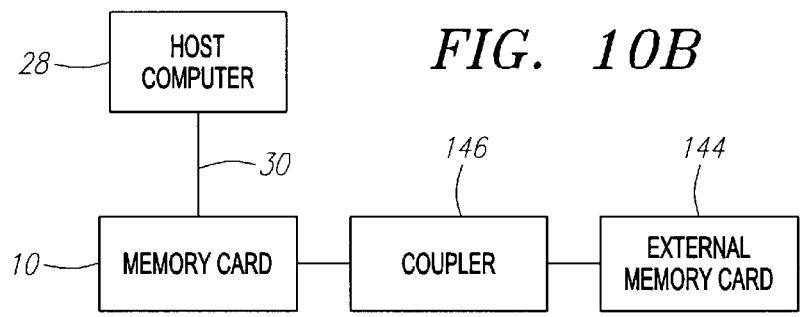
FIG. 10B is another representation of the block diagram of FIG. 10A.

Referring to FIGS. 10A and 10B, another embodiment of the present invention is shown in which host computer 28 can communicate to an external memory card 144 through memory card 10. Memory card 144 may be a PCMCIA compatible or a non-PCMCIA memory cards, such as a CFA (Compact Flash Association) or an MCIF (Miniature Card Implementation Forum) compatible memory card. Memory card 10 is coupled at its parallel interface 14 (FIG. 1) to a parallel interface of the external memory card 144 by a coupler 146. Coupler 146 represents a socket adapter which connects the pins of interface 14 of memory card 10 to the pins of the parallel interface of the external memory card 144, which has either a PCMCIA (68-pin), CFA (50-pins) or MCIF (60-pins) compatible parallel interface depending on the type of external memory card. When the external memory card 144 has a PCMCIA compatible parallel interface, each pin of this interface may be connected by coupler 146 to its corresponding pin on the parallel interface 14 of the card 10. When the external memory card 144 has a non-PCMCIA compatible interface, the pins of this interface may be connected by coupler 146 to the pins of the parallel interface 14 of the card 10 having similar functionality such that communication with the external memory card can be enabled. The parallel interface of the external memory card 144 is coupled to memory on the external memory card, and such memory may, for example, represent FLASH, SRAM, or EEPROM memory components. The controller 16 of memory card 10 is connected to parallel interface 14 by control/data lines 25 such that when coupler 146 couples memory card 10 to the external memory card 144, controller 16 has access to the memory of the external memory card 144. The external memory card 144 is powered through coupler 146 from the parallel interface 14 of memory card 10 in which power $Pwr_2$ (FIG. 3A) is supplied, via diode 39a and resistor 39b, to the pin of parallel interface 14 associated with input $Pwr_1$, and this pin is connected by coupler 146 to the input power pin of the external memory card. The controller 16 can then affect the memory of the external memory card 144 responsive to commands received from host computer 28 through cable 30, serial I/O port 12 and serial I/O transceiver 18, similar to that described earlier with the memory 11 of memory card 10.

Figures 11A, 11B:
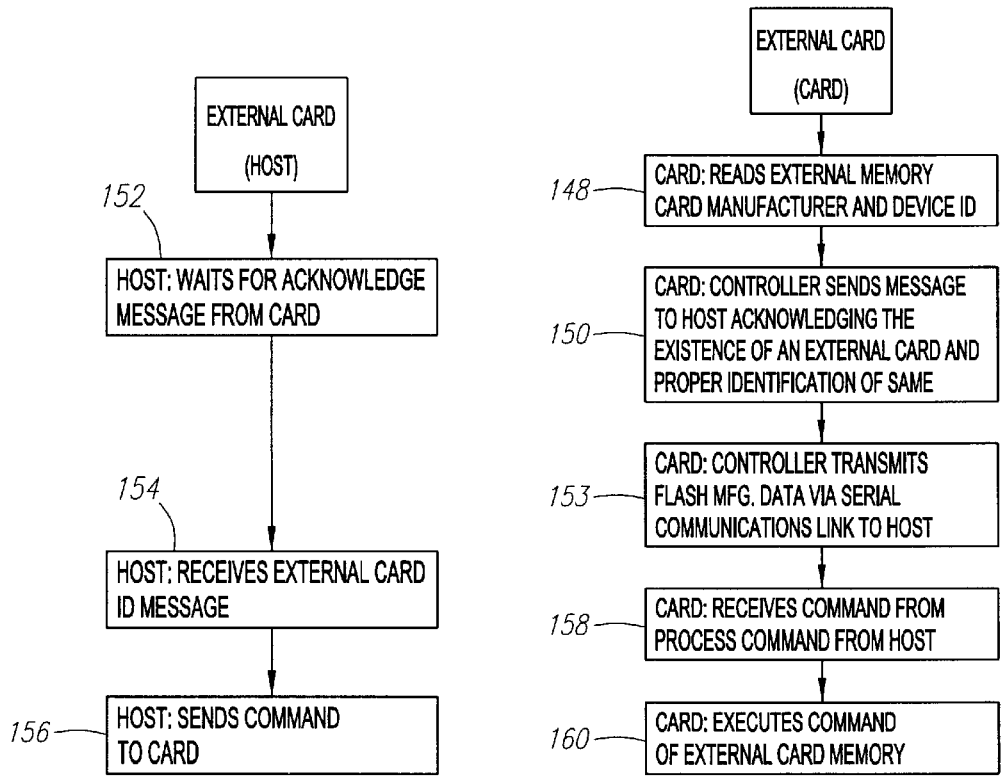
FIGS. 11A and 11B are flow charts showing the operation and programming of the host computer and memory card, respectively, when the memory card of FIGS. 1 and 2 is coupled to an external memory card.

FIGS. 11A and 11B are flow charts showing the operation and programming of the host computer 28 and the memory card 10 when external memory card 144 is coupled to memory card 10. When the external memory card 144 is coupled to memory card 10, and memory card 10 is connected via serial I/O port 12 to host computer 28, the controller 16 of the memory card reads the manufacture and Device ID stored in the memory of the external memory card through parallel interface 14 (step 148). This requires the controller to attempt to read the starting address of each memory component (i.e., chip) at which the manufacture and device ID typically is stored. Since memory chips manufactured by different companies, such as Intel, Inc. or AMD, Inc., have different command codes and communication protocols, the controller 16 may have to try different codes until the read at step 148 is successful. Codes and protocols are stored in the ROM 15 of the memory card 10 to enable the controller 16 to interface with different types of memory chips. The controller 16 can access a lookup table in the card's ROM 15 for associating read device IDs for memory chips to their memory size. Using this lookup table, the controller 16 locates the starting address of the next memory chip, if present, to read its manufacture and device ID. This polling of each chip continues until the last memory chip is read, and enables the controller 16 to determine the size of the memory on the external memory card 144. Controller 16 then sends a message to the host computer 28 acknowledging the existence of the external memory card 144 and proper identification in terms of the size of the memory of the external memory card (step 150). The controller next sends a message with Card ID data representing the manufacture and device ID (or IDs) of the memory read at step 148 to the host computer 28 (step 153). Meanwhile, the host computer 28 waits to receive the acknowledge message from the memory card (step 152), and upon receiving the acknowledge message receives thereafter the message with the Card ID data. Thereafter, the host computer 28 can send commands to the controller 16 of the memory card 10, such as Program, Erase, Write, Read, Verify Image, or Self-Test described earlier in FIGS. 4A–9A and 4B–9B, wherein the memory of the external card 144 is operated upon, rather than the memory 11 of card 10. The controller 16 uses the commands and communication protocols stored in the ROM 15 of the card in accordance with the manufacture of the memory on the external memory card 144 to carry out commands received from the host computer 28. Thus, communication between an external memory card, which may lack a serial communication interface port, and the host computer 28 can be enabled through the memory card 10 and its serial interface to the host computer.

Optionally, serial data of the data packets sent and received by the controller 16 of the memory card 10 and the host computer 28 may be encrypted prior to transmission and decrypted after reception. Typical algorithms for encryption and decryption may be used, such as the Level 2 standard defined by the National Institute of Standards and Technology (NIST) or a Data Encryption Standard (DES) issued by the U.S. National Bureau of Standards (NBS). ROM 15 of the memory card may store programming for the controller 16 for encryption of serial data to be transmitted and decryption of serial data received, and similar programming is provided to the host computer 28. In this manner, a level of security in the serial communication to and from the memory card 10 can be provided.

Memory card 10 may also provide for user authorization such as by a predefined pin number in memory of the card 10. The host computer 28 would send with a command to the card a pin number for comparison by controller 16 with the pin number stored in memory 11 or ROM 15 of the card. If the sent pin number matches that stored on the card, the pin number is considered valid and controller 16 would carry out the command. Further, the memory card 10 may include license expiration detection. The controller 16 could store in memory 11 of the card the last date when data was read or written by the host computer 28. Next time the card is powered, it could compare the stored last date with the date of license expiration also stored in memory 11 or ROM 15. If the last date exceeds the date of license expiration, the controller 16 would automatically issue commands to memory 11 to erase the memory 11 stored on the card.

From the foregoing description, it will be apparent that there has been provided an improved PCMCIA compatible memory card having a serial communication interface, and a system and method for enabling serial communication between a PCMCIA compatible memory card and a host computer. Variations and modifications in the herein described memory card, system and method in accordance with the invention will undoubted suggest themselves to those skilled in the art. Accordingly, the foregoing description should be taken as illustrative and not in a limiting sense.

What is claimed is:

1. A system for enabling serial communication of data between a memory card and a computer comprising:

a PCMCIA compatible memory card having a data storage memory than can be written to and read from via a PCMCIA compatible parallel interface and a serial communication port through which data stored in the data storage memory can be transmitted in a serial format;

a computer having at least one serial communication port; and means for connecting the serial communication port of said memory card to the serial communication port of said computer through which serial data is transmitted between said memory card and said computer, wherein said memory card includes (a) one or more memory components, (b) a controller coupled to said memory components, and (c) a transceiver coupled between said controller and said serial communication port of the memory card which enables said controller to send and receive signals representing data through said serial communication port of the memory card, and wherein said controller comprises means for receiving a file from said computer through said serial communication port of said memory card and storing said received file in said memory.

2. The system according to claim 1 wherein said memory card further comprises:

one or more memory components; and a parallel interface for connecting said memory card into a PCMCIA compatible slot of a computer-based system to enable said computer-based system to access the memory components of said memory card.

3. The system according to claim 1 wherein said memory components represents one or more FLASH memory components.

4. The system according to claim 1 wherein said memory components represents a memory array representing FLASH memory components and an ATA controller for accessing the FLASH memory components.

5. The system according to claim 1 wherein said controller operates in accordance with commands received from said computer through the serial communication port of said memory card.

6. The system according to claim 1 wherein said controller comprises means for writing data received from said computer through said serial communication port of said memory card to said memory.

7. The system according to claim 1 wherein said controller comprises means for reading data from said memory and transmitting read data through said serial communication port of said memory card to said computer.

8. The system according to claim 1 wherein said controller comprises means for erasing data from said memory in response to a command from said computer sent through said serial communication port of said memory card.

9. The system according to claim 1 wherein said computer comprises means for sending said file to said memory card in which said file is provided from one of a memory storage associated with said computer or a network coupled to said computer.

10. The system according claim 1 wherein said controller comprises means for performing a self test in response to a command from said computer sent through said serial communication port of said memory card.

11. The system according to claim 1 wherein said transceiver provides for decoding signals received from said serial communication port of the memory card into signals appropriate for said controller, and for encoding signals received from said controller into signals appropriate for transmission through said serial communication port of said memory card to said serial communication port of said computer via said connecting means.

12. The system according to claim 1 wherein said connecting means is a cable having one end capable of connecting to said serial communication port of the memory card and having another end capable of connecting to the serial communication port of the computer.

13. The system according to claim 12 wherein said cable supplies power to said memory card from said computer, said power being provided to said cable from said computer through another cable from another port of the computer.

14. The system according to claim 1 wherein said connecting means comprises means for supplying power to said memory card.

15. The system according to claim 14 wherein said memory card further comprises a parallel interface and means for receiving power from one of said parallel interface and said connecting means.

16. The system according to claim 1 wherein said serial communication between said memory card and said computer operates in accordance with one of the communication protocols selected from the group of RS-212, RS-422, RS-485, USB, or IrDA.

17. A system for enabling serial communication of data between a memory card and a computer comprising:
   a PCMCIA compatible memory card having a data storage memory than can be written to and read from via a PCMCIA compatible parallel interface and a serial communication port through which data stored in the data storage memory can be transmitted in a serial format;
   a computer having at least one serial communication port; and
   means for connecting the serial communication port of said memory card to the serial communication port of said computer through which serial data is transmitted between said memory card and said computer,
   wherein said memory card represents a first memory card and said memory card further comprises a PCMCIA compatible interface, and said system further comprises means for connecting said first memory card at said PCMCIA compatible interface to an interface of a second memory card to enable communication of data between said computer and said second memory card through said first memory card.

18. The system according to claim 17 wherein said second memory card has memory and said first memory card has a controller which operates in accordance with commands received from said computer through said serial communication port to operate upon the memory of said second memory card through said means from connecting said first memory card to said second memory card.

19. A system for enabling serial communication of data between a memory card and a computer comprising:
   a PCMCIA compatible memory card having a data storage memory than can be written to and read from via a PCMCIA compatible parallel interface and a serial communication port through which data stored in the data storage memory can be transmitted in a serial format;
   a computer having at least one serial communication port; and
   means for connecting the serial communication port of said memory card to the serial communication port of said computer through which serial data is transmitted between said memory card and said computer,
   wherein said memory card includes (a) one or more memory components, (b) a controller coupled to said memory components, and (c) a transceiver coupled between said controller and said serial communication port of the memory card which enables said controller to send and receive signals representing data through said serial communication port of the memory card, and
   wherein said controller includes means for encrypting data to be sent through said serial communication port of the memory card to said computer, and means for decrypting data received from said serial communication port of the memory card from said computer.

20. A system for enabling serial communication of data between a memory card and a computer comprising:
   a PCMCIA compatible memory card having a data storage memory than can be written to and read from via a PCMCIA compatible parallel interface and a serial communication port through which data stored in the data storage memory can be transmitted in a serial format;
   a computer having at least one serial communication port; and
   means for connecting the serial communication port of said memory card to the serial communication port of said computer through which serial data is transmitted between said memory card and said computer,
   wherein said memory card includes (a) one or more memory components, (b) a controller coupled to said memory components, and (c) a transceiver coupled between said controller and said serial communication port of the memory card which enables said controller to send and receive signals representing data through said serial communication port of the memory card, and
   wherein said controller comprises means for detecting an expiration date associated with said memory card.

21. A system for enabling serial communication of data between a memory card and a computer comprising:
   a PCMCIA compatible memory card having a data storage memory than can be written to and read from via a PCMCIA compatible parallel interface and a serial communication port through which data stored in the data storage memory can be transmitted in a serial format;
   a computer having at least one serial communication port; and
   means for connecting the serial communication port of said memory card to the serial communication port of said computer through which serial data is transmitted between said memory card and said computer,
   wherein said memory card includes (a) one or more memory components, (b) a controller coupled to said memory components, and (c) a transceiver coupled between said controller and said serial communication port of the memory card which enables said controller to send and receive signals representing data through said serial communication port of the memory card, and
   wherein said controller comprises means for operating said memory card in accordance with said memory card receiving a valid pin number received from said computer.

22. A method of transferring data from a first device into a second device, the method comprising the steps of:

plugging a memory card into the first device so that the memory card interfaces with the first device using a parallel interface;

writing data from the first device into a data storage element in the memory card via the parallel interface;

linking, via a serial interface, the memory card to the second device; and sending the data written in the writing step from the data storage element in the memory card to the second device via the serial interface, wherein the memory card interfaces with the second device using a USB interface.

23. The method of claim 22, wherein the memory card interfaces with the first device using a parallel interface that conforms with the PCMCIA standard.

24. A system for enabling serial communication of data between a memory card and a computer comprising:

a memory card having (a) a card-shaped form factor adapted for insertion into a connectorized slot in an electronic device, (b) a data storage memory than can be written to and read from via a parallel interface, (c) a connector located on one edge of the memory card through which parallel interface signals are received by the card from the electronic device and through which parallel interface signals are transmitted by the card to the electronic device, and (d) a serial communication port through which data stored in the data storage memory can be transmitted in a serial format;

a computer having at least one serial communication port; and means for connecting the serial communication port of said memory card to the serial communication port of said computer through which serial data is transmitted between said memory card and said computer, wherein said memory card comprises one or more memory components, a controller coupled to said memory components, and a transceiver coupled between said controller and said serial communication port of the memory card which enables said controller to send and receive signals representing data through said serial communication port of the memory card, and wherein said controller comprises means for receiving a file from said computer through said serial communication port of said memory card and storing said received file in said memory.

25. The system according to claim 24 wherein said memory card further comprises:

one or more memory components; and a parallel interface for connecting said memory card into a compatible slot of a computer-based system to enable said computer-based system to access the memory components of said memory card.

26. The system according to claim 24 wherein said memory components represents one or more FLASH memory components.

27. The system according to claim 24 wherein said memory components represents a memory array representing FLASH memory components and an ATA controller for accessing the FLASH memory components.

28. The system according to claim 24 wherein said controller operates in accordance with commands received from said computer through the serial communication port of said memory card.

29. The system according to claim 24 wherein said controller comprises means for writing data received from said computer through said serial communication port of said memory card to said memory.

30. The system according to claim 24 wherein said controller comprises means for reading data from said memory and transmitting read data through said serial communication port of said memory card to said computer.

31. The system according to claim 24 wherein said controller comprises means for erasing data from said memory in response to a command from said computer sent through said serial communication port of said memory card.

32. The system according to claim 24 wherein said computer comprises means for sending said file to said memory card in which said file is provided from one of a memory storage associated with said computer or a network coupled to said computer.

33. The system according claim 24 wherein said controller comprises means for performing a self test in response to a command from said computer sent through said serial communication port of said memory card.

34. The system according to claim 24 wherein said connecting means is a cable having one end capable of connecting to said serial communication port of the memory card and having another end capable of connecting to the serial communication port of the computer.

35. The system according to claim 34 wherein said cable supplies power to said memory card from said computer, said power being provided to said cable from said computer through another cable from another port of the computer.

36. The system according to claim 24 wherein said connecting means comprises means for supplying power to said memory card.

37. The system according to claim 36 wherein said memory card further comprises a parallel interface and means for receiving power from one of said parallel interface and said connecting means.

38. The system according to claim 24 wherein said serial communication between said memory card and said computer operates in accordance with one of the communication protocols selected from the group of RS-212, RS-422, RS-485, USB, or IrDA.

39. The system according to claim 24 wherein said memory card represents a first memory card and said memory card further comprises a PCMCIA compatible interface, and said system further comprises means for connecting said first memory card at said PCMCIA compatible interface to an interface of a second memory card to enable communication of data between said computer and said second memory card through said first memory card.

40. The system according to claim 24 wherein said controller comprises:

means for encrypting data to be sent through said serial communication port of the memory card to said computer; and means for decrypting data received from said serial communication port of the memory card from said computer.

41. The system according to claim 24 wherein said controller comprises means for detecting an expiration date associated with said memory card.

42. The system according to claim 24 wherein said controller comprises means for operating said memory card in accordance with said memory card receiving a valid pin number received from said computer.

43. The system according to claim 39 wherein said second memory card has memory and said first memory card has a controller which operates in accordance with commands received from said computer through said serial communication port to operate upon the memory of said second memory card through said means from connecting said first memory card to said second memory card.

44. A system for enabling serial communication of data between a memory card and a computer comprising:

a memory card having (a) a card-shaped form factor adapted for insertion into a connectorized slot in an electronic device, (b) a data storage memory than can be written to and read from via a parallel interface, (c) a connector located on one edge of the memory card through which parallel interface signals are received by the card from the electronic device and through which parallel interface signals are transmitted by the card to the electronic device, and (d) a serial communication port through which data stored in the data storage memory can be transmitted in a serial format;

a computer having at least one serial communication port; and means for connecting the serial communication port of said memory card to the serial communication port of said computer through which serial data is transmitted between said memory card and said computer, wherein said transceiver provides for decoding signals received from said serial communication port of the memory card into signals appropriate for said controller, and for encoding signals received from said controller into signals appropriate for transmission through said serial communication port of said memory card to said serial communication port of said computer via said connecting means.

\* \* \* \* \*

UNITED STATES PATENT AND TRADEMARK OFFICE
CERTIFICATE OF CORRECTION

PATENT NO. : 6,434,648 B1
DATED : August 13, 2002
INVENTOR(S) : Jacques Assour et al.

It is certified that error appears in the above-identified patent and that said Letters Patent is hereby corrected as shown below:

Column 13,
Line 22, change "RS-212" to -- RS-232 --.

Column 16,
Line 40, change "RS-212" to -- RS-232 --.

Signed and Sealed this

Eighteenth Day of March, 2003

JAMES E. ROGAN
*Director of the United States Patent and Trademark Office*